E. W. JUNGNER.
ELECTRODE FOR GAS ELEMENTS.
APPLICATION FILED MAY 13, 1907.
913,390.
Patented Feb. 23, 1909.
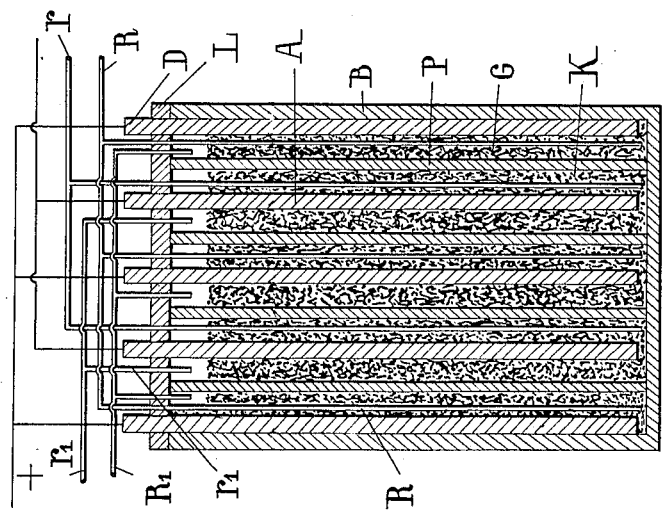
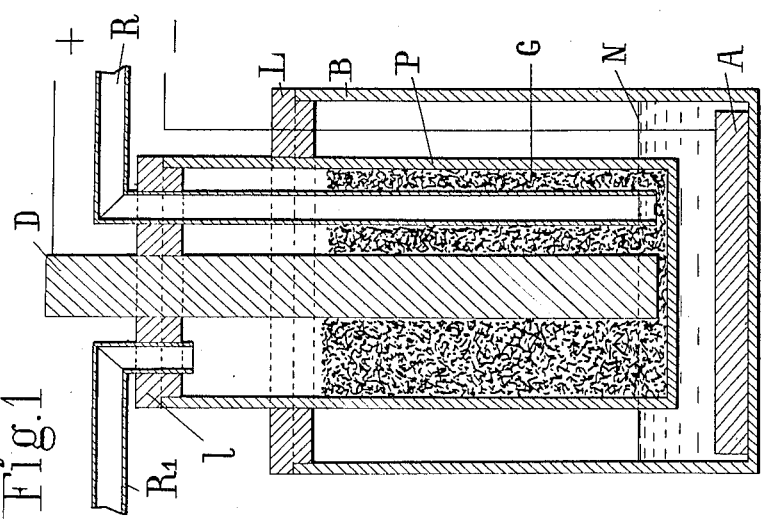
Witnesses.
Inventor.
Ernst Waldemar Jungner
BY
Atty.

UNITED STATES PATENT OFFICE.

ERNST WALDEMAR JUNGNER, OF KNEIPPBADEN, NORRKÖPING, SWEDEN.

ELECTRODE FOR GAS ELEMENTS.

No. 913,390.     Specification of Letters Patent.     Patented Feb. 23, 1909.

Application filed May 13, 1907. Serial No. 373,436.

*To all whom it may concern:*

Be it known that I, ERNST WALDEMAR JUNGNER, a subject of the King of Sweden, residing at and whose post-office address is Kneippbaden, Norrköping, Sweden, have invented certain new and useful Improvements in Electrodes for Gas Elements; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

It is known, that if an electrode of porous carbon the pores of which being filled with oxygen, be placed with a suitable metal in an appropriate electrolyte, for instance with zinc in dilute sulfuric acid, and the carbon be united with the metal by means of an appropriate resistance, an electric current will be generated. The cause of the current is that the zinc is dissolved in the acid to produce sulfate of zinc, while the hydrogen made free at the carbon electrode combines with the oxygen contained in the pores of the carbon. This current will last so long as the carbon electrodes contain any oxygen. In proportion as the oxygen is consumed, its space will be occupied by the sulfuric acid, which then penetrates into the pores and fills the same. When all oxygen contained in the piece of carbon is consumed and the pores entirely filled up with the acid, the current ceases. The carbon electrode has now lost its power of absorbing oxygen and will reobtain this power only when the sulfuric acid is suitably removed, for instance, by heating. This absorption of the electrolyte by the pores of the carbon is the real cause of the fact that porous carbon does not possess the property of effecting a continuous access of gas in the so called gas elements.

The present invention relates to a device, by means of which the reacting gas permanently obtains a great surface of contact with both the electrolyte and the electrode conductor.

Figure 1 shows a device for producing a continuous depolarization by means of the oxygen of the air. Fig. 2 shows a modification where two gases are caused to chemically combine.

In the bottom of a vessel —B— made of any suitable substance as glass, there is an electrode —A— of any appropriate metal, for instance iron. The vessel contains an appropriate electrolyte, as a solution of any salt of ammonia. Within this vessel is placed another vessel —P— made of a substance permeable to the electrolyte, as clay, parchment or the like. This vessel P contains a conductor —D— of electrically conducting carbon or of a suitable metal. Around this conductor are packed small pieces of any porous electrically conductive carbon G such as porous graphite, which are saturated with the electrolyte. The shape and size of these pieces of carbon are so chosen that the interspaces between them are of such a size that the electrolyte may not be absorbed by them by means of the capillarity so as to fill the said interspaces whereby they will offer the greatest possible surface of contact to the gas contained between them. The size and quantity of pores in the porous pieces of carbon are also to be so chosen that the capillary action of these pores will not be able entirely to retain the electrolyte with which they are filled, but that the electrolyte partly under the influence of gravity is slowly permitted to settle at the bottom of the vessel. Thus holes are created within the pieces of carbon, whereby the surface of contact between the air on the one part and the electrolyte and the conductor on the other part will be further increased. The porous vessel is submerged in the electrolyte only so far, that the level —N— of the latter is only a little above the bottom of the porous vessel. This same vessel is covered with a lid —L— impermeable to the air and provided with two glass pipes passing through the lid, of which the one —R— opens into the lower part of the carbon layer, and the other —$R_1$— opens above the same. If now a current of air or oxygen gas is caused to pass through the glass pipe —R— and if the carbon be connected with the iron electrode through a suitable resistance, then a constant electric current will be generated. In this way the iron will be dissolved in producing double salts of iron and ammonium, out of which hydrates of iron will by and by be precipitated by the ammonia generated at the cathode, and be deposited upon the bottom of the vessel. By means of this device there is effected a continuous combining of iron and oxygen of the air to generate an electric current.

Fig. 2 shows a similar device for generating an electric current by means of the chemical reaction between two gases. —B— is a rectangular reservoir of any suitable substance for instance stone ware; into this plates —p— are placed made of any appropriate porous substance, for instance burnt clay. These plates are glued to the walls of the vessel so as to divide this into compartments separated from each other. Each of these compartments contains conductors —D— and —A— of any appropriate substance, for instance graphite, or any other form of electrically conductive carbon or they may be of any suitable metal. The interspaces between the conductors and the porous diaphragms are filled up with small pieces —G—, —K— of porous electrically conductive carbon saturated with an electrolyte, as sulfuric acid. Even the porous diaphragms are saturated with the same electrolyte. The lid —L— separates the different compartments one from another and from the exterior air. Passing through the lid into the compartments are two glass pipes R, $R_1$, and $r$, $r_1$, respectively, of which one pipe opens into the lower part of the carbon pieces and the other above the same. The glass pipes are, as shown in Fig. 2, united so that a gas current admitted through —R— passes the carbon pieces contained in the compartments and then escapes through the pipe —$R_1$—. In the same way a gas current is admitted through the pipe —$r$— and passes through the layer of carbon pieces contained in the corresponding compartments, and escapes through the pipe $r_1$. If, as diagrammatically shown in this figure, the electrodes in every second compartment be connected by means of a resistance with the electrodes in the compartments between them, and when there is admitted through the former compartments any oxidizing gas as air, and through the latter any reducing gas, as hydrogen, a continuous electric current will be generated, whereby the hydrogen and the oxygen will combine to form water. The sulfuric acid diluted by this reaction is let out and may after its concentration be used anew. In order still more to increase the surface of contact between the gas, the electrolyte and the conductor, the carbon pieces may be impregnated with small quantities of such substances as have a greater power of absorbing gases than the electrically conducting carbon itself, for instance carbon obtained from blood, certain metals in finely divided state, as silver, palladium, platinum and the like.

What I claim is:—

1. In a galvanic gas element, an actuating electrolyte and electrodes each consisting of carbon of such high porosity as to be incapable of retaining such a quantity of electrolyte as would fill the pores thereof.

2. In a galvanic gas element, an actuating electrolyte and electrodes, one of said electrodes being of carbon of such high porosity as to be incapable of retaining such a quantity of electrolyte as would fill the pores thereof.

3. In a galvanic gas element, an actuating electrolyte and electrodes, one of said electrodes being of such high porosity as to be incapable of retaining such a quantity of electrolyte as to fill the pores thereof and a gas contained within the pores.

In testimony, that I claim the foregoing as my invention, I have signed my name in presence of two subscribing witnesses.

ERNST WALDEMAR JUNGNER.

Witnesses:
I. BOIJE,
FRITHIOF NYLIN.